United States Patent [19]

Minks et al.

[11] 3,719,201
[45] March 6, 1973

[54] AUTOMOBILE ELECTRICAL SYSTEM
[76] Inventors: Ivan G. Minks, 5617 Welmering Drive, St. Louis, Mo. 63123; Melvin P. Minks, 1950 Cherokee Street, St. Louis, Mo. 63118
[22] Filed: March 12, 1971
[21] Appl. No.: 123,606

[52] U.S. Cl. ............... 137/351, 137/383, 200/44, 200/155 R, 200/166 BE, 251/129
[51] Int. Cl. ...... B60r 25/04, F16k 35/06, H01h 9/28
[58] Field of Search ........ 70/243, 421; 137/351, 383; 200/44, 155 R, 166 BE; 251/129, 141

[56] References Cited

UNITED STATES PATENTS

| 3,550,717 | 12/1970 | Doty | 137/383 X |
|---|---|---|---|
| 758,025 | 4/1904 | Taylor | 70/421 X |
| 2,022,070 | 11/1935 | Williams et al. | 70/421 |
| 1,630,077 | 5/1927 | Schwinn | 251/129 UX |
| 3,168,242 | 2/1965 | Diener | 251/129 X |
| 3,174,502 | 3/1965 | Howarth et al. | 200/44 X |
| 3,190,979 | 6/1965 | Rose et al. | 200/44 X |
| 2,335,388 | 11/1943 | Conradty et al. | 200/155 R |
| 1,659,502 | 2/1928 | Tyson | 200/44 UX |
| 1,774,801 | 9/1930 | Macke et al. | 200/166 BE X |

Primary Examiner—Albert G. Craig, Jr.
Attorney—Bedell & Burgess

[57] ABSTRACT

An electric fuel line lock for automobiles is opened by a solenoid, the ground line from which is connected to a normally open contact on the automobile ignition switch lock which is closed only when the ignition switch lock is in the "on" position, so that when the ignition switch lock is in the "off" position the fuel line is locked and the automobile cannot be operated. To prevent unauthorized operation of the ignition switch, the ignition switch includes an extra tumbler engageable with a notch or groove in a surface of the key other than the normal tumbler engaging edge of the key.

3 Claims, 7 Drawing Figures

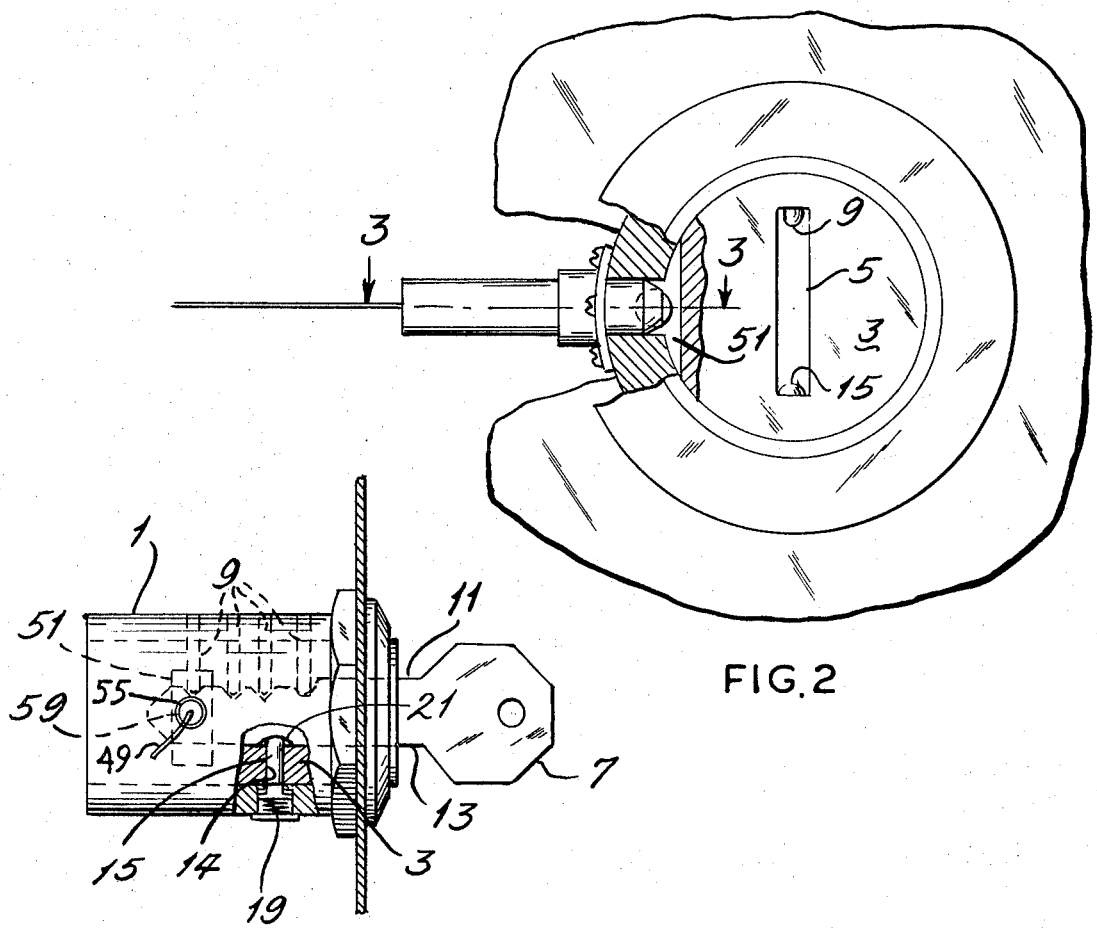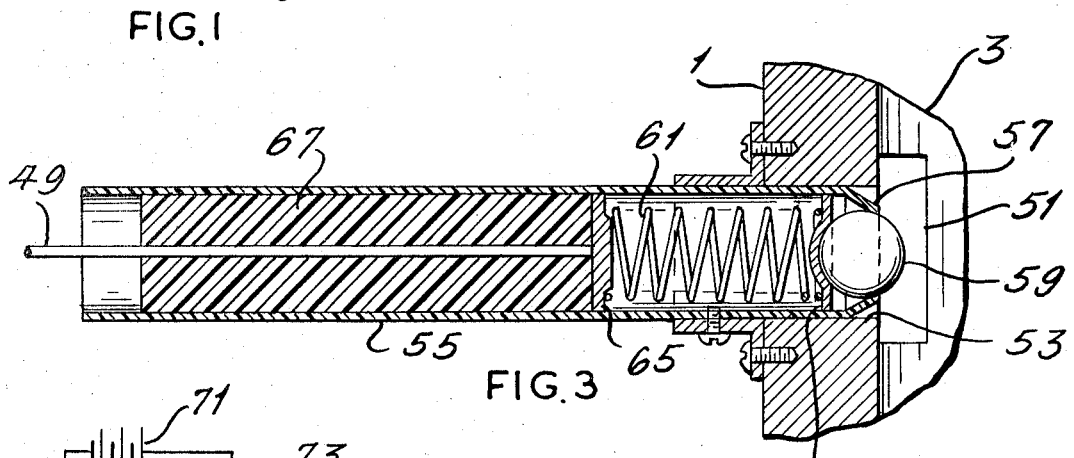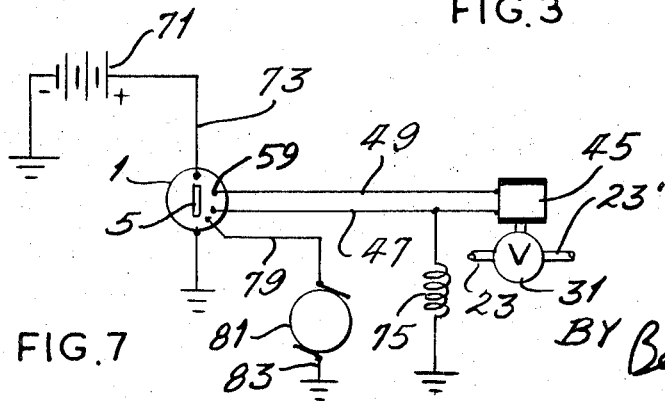

PATENTED MAR 6 1973 3,719,201
SHEET 2 OF 2
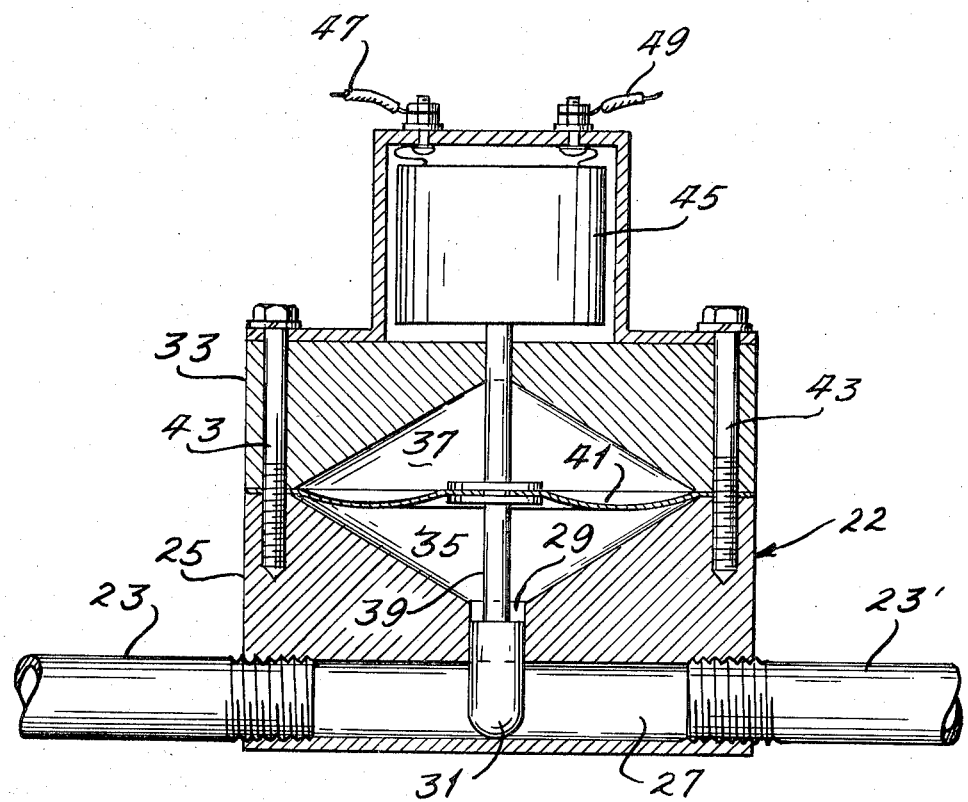
FIG. 4
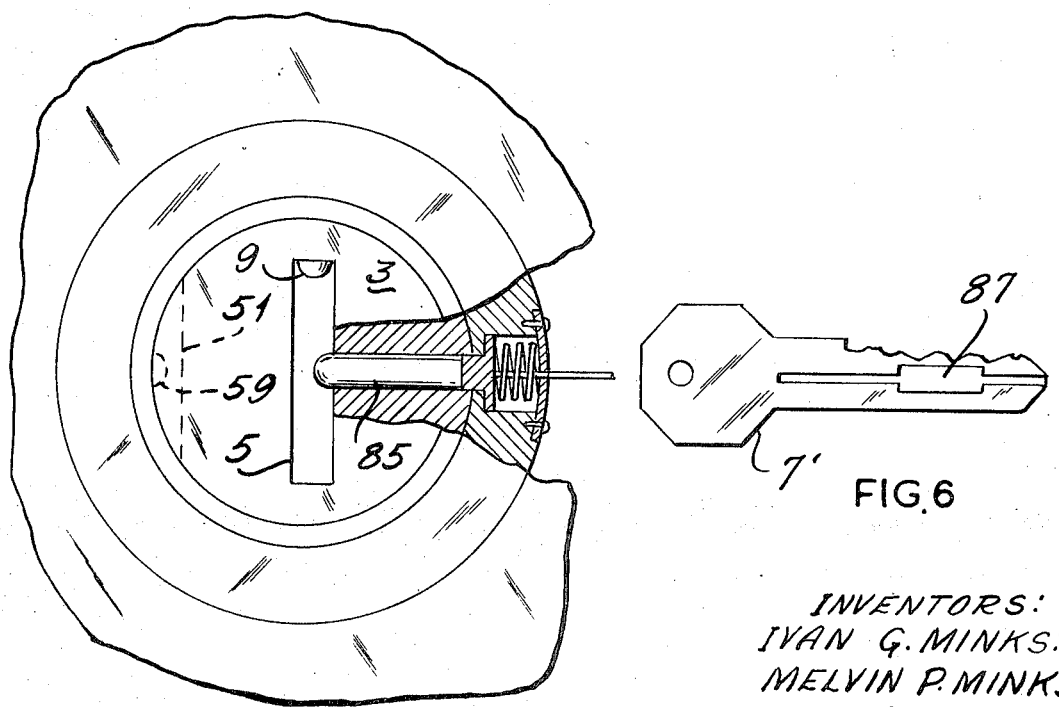
FIG. 5
FIG. 6
INVENTORS:
IVAN G. MINKS:
MELVIN P. MINKS
BY Bedell & Burgess
ATTORNEYS.

AUTOMOBILE ELECTRICAL SYSTEM

BACKGROUND OF THE INVENTION

1. Field of the Invention

The invention relates to automobile ignition systems and consists particularly in a fuel line lock controlled by the ignition switch.

2. The Prior Art

The prior art discloses automobile fuel line locks controlled by the ignition switch in which the supply conductor or "hot" line to the fuel line valve solenoid passes through the ignition switch. In such arrangements, the valve can be energized by simply by-passing the ignition switch with an external jumper from the supply conductor into the switch to the supply conductor leading from the switch to the solenoid.

SUMMARY OF THE INVENTION

The invention makes the use of the common supply conductor jumper useless by connecting the ground return conductor from the locking valve solenoid to a normally open contact on the ignition switch, so that even if the conventional supply conductor jumper is placed across the ignition switch, the solenoid circuit will not be energized and the fuel line valve will remain closed. The invention also makes operation of the ignition switch impossible with a conventional master key by providing an additional tumbler engageable with a different surface of the key than the conventional tumblers, necessitating an additional groove or notch in the other surface of the key to actuate the switch.

Other objects and advantages include the provision of a simple device, with few moving parts, readily adaptable to existing ignition systems.

BRIEF DESCRIPTION OF THE DRAWINGS

FIG. 1 is a side elevational view, partially sectionalized, of an ignition switch incorporating the invention.

FIG. 2 is a front elevational view of the switch illustrated in FIG. 1.

FIG. 3 is a horizontal sectional view along line 3—3 of FIG. 2, showing the locking valve solenoid grooved line switch.

FIG. 4 is a vertical sectional view of the locking valve, its solenoid, and adjacent portions of the fuel line.

FIG. 5 is a front elevational view, partially sectionalized, of a modified form of the switch.

FIG. 6 is a side elevational view of a key grooved for use with the switch of FIG. 5.

FIG. 7 is a wiring schematic of the fuel line valve solenoid circuit.

DESCRIPTION OF THE PREFERRED EMBODIMENTS

In FIGS. 1 and 2, the conventional ignition switch includes the sleeve 1, in which is rotatably mounted cylinder 3, formed with an axial flat slot 5 to receive key 7. For retaining the cylinder against unauthorized rotation, a series of tumblers 9 extend upwardly from key slot 5, being movable into unlocking position by insertion of a properly milled key having notches in its upper edge 11, its lower edge 13 being straight.

To prevent rotation of cylinder 3 even with a key having a properly milled upper edge 11, below key slot 5, cylinder 3 is drilled at 14 to receive an additional tumbler 15, and a cooperating sleeve tumbler 17, aligned with tumbler 15 is mated in a suitable cavity in sleeve 1 and is biased upwardly by a spring to project upwardly into cylinder hole 14 to lock the cylinder against rotation. Insertion of a key having a straight lower edge 13 will force tumbler 15 downwardly into the sleeve, preventing rotation of the cylinder. Only a key notched as at 21 along its straight edge 13 will move tumbler 15 to the unlocking position shown in FIG. 1 in which tumblers 15 and 17 are flush with the opposed cylindrical surfaces of cylinder 3 and sleeve 1.

In addition to the ignition switch lock we provide a valve 22 controlled by the ignition switch, in full line 23, 23'. Valve 22 comprises a body 25 formed with a fuel passage 27, to the ends of which the fuel line sections 23 and 23' are connected, and a transverse passage 29, in which is slidably mounted valve gate 31 for movement from a position (FIG. 4) blocking fuel passage 27 to a retracted position clearing passage 27 and permitting the passage of fuel therethrough from the fuel tank to the carburetor. Valve body 25 has an upper part 33, and both body 25 and its upper part 33 are formed with recesses 35 and 37 in their opposed faces, recess 37 communicating with valve gate passage 29. Valve gate 31 is formed with a stem 39 passing through both recesses 35 and 37, and to form a seal to prevent the escape of fuel or fuel vapor from the valve, a flexible diaphragm 41 is sealingly secured at its center to valve stem 39 and clamped between the opposed faces of valve body 25 and its upper part 33 by bolts securing the upper part to the valve body. It will be evident from the foregoing that diaphragm 41 will accommodate necessary opening and closing translation of valve stem 39, but will prevent the passage of any fluid or vapors from recess 35 into recess 37 or to the exterior of the valve body.

A vertically acting solenoid 45 is mounted on top of valve body upper part 33 and is operatively connected to valve stem 39 to raise the latter and open the valve when the solenoid is energized.

The negative terminal of solenoid 45 is connected by supply conductor 47 to ignition switch 1, and ground conductor 49 is not connected directly to a grounded part of the automobile but to a normally open switch incorporated in the ignition switch lock, which includes a recess in the form of a notch 51 in the peripheral surface of lock cylinder 3. In radial alignment with notch 51 when the barrel is in locked of "off" position, sleeve 1 is drilled at 53 to receive the end of a tube 55 of dielectric material, the inner end of which is flush with the inner surface of sleeve 1 and is formed with an annular shoulder 57 to retain a conductive metal ball 59 within tube 55 with a portion of the ball projecting into the sleeve interior but spaced from the surface of cylinder 3 within notch 51.

Within tube 55, a metal coil spring 61 is compressed between a pair of spaced conductive discs 63 and 65, the former disc bearing against ball 59 and biasing it outwardly of tube 55 and inwardly of lock sleeve 1, and the latter disc being fixedly held in tube 55 by tube core 67, which is also of dielectric material such as nylon. Ground conductor 49 from solenoid 45 passes through core 67 and is connected to disc 65, and spring 61 and disc 63 form a conductive path therefrom to ball 59.

Only by turning cylinder 3 with a properly notched key, the unnotched portion of the cylinder periphery will engage ball 59, providing a ground return for the solenoid, and thus opening valve 31.

With this arrangement, even if a thief puts a jumper across the ignition switch, from the ignition switch supply wire, solenoid 45 will not be energized to open fuel lock valve 31 because due to the absence of contact between ball 59 and lock cylinder 3, the solenoid circuit will not be grounded.

The circuitry is illustrated schematically in FIG. 7, in which the positive terminal of battery 71 is connected by supply conductor 73 to the ignition switch, sleeve 1 and barrel 3 of which are grounded. Supply conductor 47 connects an ignition switch terminal to coil 75, which is grounded, and to solenoid 45 which is grounded, as described above, through the ignition switch. Another supply conductor 79 connects the ignition switch to starter 81, which has its own ground 83. A jumper from conductor 73 to wire 47 via the ignition switch negative terminal would not energize solenoid 45 to open valve 31, because as long as the switch lock is in the "off" position, the solenoid ground wire 49 will not be grounded.

Even if a thief has a master key, the straight bottom edge of the key will not release tumblers 15, 17 to permit rotation of the lock cylinder and thus energize the circuits controlled by the ignition switch lock.

FIGS. 5 and 6 illustrate a modified form of the ignition switch lock and key in which the additional tumbler 85 is located at the side rather than at the bottom of key slot 5 and the corresponding side of the key 7' is grooved as at 87 to properly position tumbler 85 to release the cylinder.

The details of the ignition system disclosed herein may be varied substantially without departing from the spirit of the invention and the exclusive use of those modifications coming within the scope of the claims is contemplated.

We claim:

1. In an automobile electrical system, an ignition switch including a lock, a source of electric power, a fuel line valve normally closed, a solenoid operatively connected to said valve to open the same when energized, an electrical supply conductor connecting said solenoid to said power source, a normally open ground contact on said ignition switch lock closable only by moving said ignition switch lock to unlocked position, a conductor connecting said solenoid to said ground contact and forming the only ground connection of said solenoid, said ignition switch lock including a sleeve and a cylinder rotatable therein, said normally open contact comprising the peripheral surface of said cylinder, a contact element mounted in said sleeve and resiliently biased radially inwardly of said sleeve a predetermined distance toward said cylinder, said cylinder being formed with a recess in its peripheral surface in registry with said contact element when the cylinder is in locked position, the surface of said cylinder within said recess being spaced from said contact element.

2. In an automobile electrical system according to claim 1, said normally open contact including a housing of dielectric material mounted in said sleeve, said contact element comprising a ball in said housing, and spring means within said housing bearing against the surface of said ball remote from the cylinder, said housing including means retaining said ball in spaced relation with the surface of said cylinder within said recess.

3. In an automobile electrical system according to claim 2, said spring means comprising a metal coil spring compressed in said housing, said conductor including said coil spring.

* * * * *